(12) United States Patent
Serebrin

(10) Patent No.: US 11,870,780 B2
(45) Date of Patent: *Jan. 9, 2024

(54) ADDRESS VALIDATION USING SIGNATURES

(71) Applicant: Google LLC, Mountain View, CA (US)

(72) Inventor: Benjamin C. Serebrin, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/181,432

(22) Filed: Mar. 9, 2023

(65) Prior Publication Data

US 2023/0216848 A1 Jul. 6, 2023

Related U.S. Application Data

(63) Continuation of application No. 17/572,066, filed on Jan. 10, 2022, now Pat. No. 11,627,131, which is a
(Continued)

(51) Int. Cl.
*H04L 9/40* (2022.01)
*G06F 12/14* (2006.01)
(Continued)

(52) U.S. Cl.
CPC ...... *H04L 63/0876* (2013.01); *G06F 12/1081* (2013.01); *G06F 12/1408* (2013.01);
(Continued)

(58) Field of Classification Search
CPC . H04L 63/0876; H04L 9/3247; H04L 63/062; H04L 63/164; G06F 12/1081;
(Continued)

(56) References Cited

U.S. PATENT DOCUMENTS 6,892,304 B1 * 5/2005 Galasso .................. G06F 21/57
712/E9.082
7,487,327 B1 * 2/2009 Chang .................. G06F 12/1081
710/3
(Continued)

FOREIGN PATENT DOCUMENTS

CN 101004714 7/2007
CN 101004717 7/2007
(Continued)

OTHER PUBLICATIONS

Amit et al., "IOMMU: Strategies for Mitigating the IOTLB Bottleneck," ISCA'10 Proceedings of the 2010 international conference on Computer Architecture, Jun. 2010, pp. 256-274.
(Continued)

*Primary Examiner* — Ayoub Alata
(74) *Attorney, Agent, or Firm* — Fish & Richardson P.C.

(57) ABSTRACT

Methods, systems, and apparatus, including computer programs encoded on computer storage media, for generating signed addresses. One of the methods includes receiving, by a component from a device, a plurality of first requests, each first request for a physical address and including a virtual address, determining, by the component, a first physical address using the virtual address, generating a first signature for the first physical address, and providing, to the device, a response that includes the first signature, receiving, from the device, a plurality of second requests, each second request for access to a second physical address and including a second signature, determining, by the component for each of the plurality of second requests, whether the second physical address is valid using the second signature, and for each second request for which the second physical address is determined to be valid, servicing the corresponding second request.

13 Claims, 3 Drawing Sheets

Related U.S. Application Data continuation of application No. 16/869,947, filed on May 8, 2020, now Pat. No. 11,223,620, which is a continuation of application No. 16/402,561, filed on May 3, 2019, now Pat. No. 10,666,652, which is a continuation of application No. 16/031,525, filed on Jul. 10, 2018, now Pat. No. 10,326,763, which is a continuation of application No. 15/661,632, filed on Jul. 27, 2017, now Pat. No. 10,027,666, which is a continuation of application No. 14/867,250, filed on Sep. 28, 2015, now Pat. No. 9,749,319.

(60) Provisional application No. 62/164,288, filed on May 20, 2015.

(51) Int. Cl.
*G06F 21/79* (2013.01)
*G06F 12/1081* (2016.01)
*H04L 9/32* (2006.01)

(52) U.S. Cl.
CPC .......... *G06F 12/1475* (2013.01); *G06F 21/79* (2013.01); *H04L 9/3247* (2013.01); *H04L 63/062* (2013.01); *H04L 63/164* (2013.01); *G06F 2212/1052* (2013.01)

(58) Field of Classification Search
CPC .. G06F 12/1408; G06F 12/1475; G06F 21/79; G06F 2212/1052
See application file for complete search history.

(56) References Cited

U.S. PATENT DOCUMENTS

| | | | |
|---|---|---|---|
| 8,108,321 | B2 | 1/2012 | Neal et al. |
| 9,749,319 | B2 | 8/2017 | Serebrin |
| 10,027,666 | B2 | 7/2018 | Serebrin |
| 2004/0255124 | A1 | 12/2004 | Courcambeck et al. |
| 2006/0253708 | A1 | 11/2006 | Bardouillet et al. |
| 2007/0294496 | A1 | 12/2007 | Goss et al. |
| 2008/0098196 | A1 | 4/2008 | Miyamoto |
| 2009/0049222 | A1 | 2/2009 | Lee et al. |
| 2009/0138729 | A1 | 5/2009 | Hashimoto et al. |
| 2010/0082927 | A1 | 4/2010 | Riou |
| 2012/0066493 | A1 | 3/2012 | Widergren et al. |
| 2012/0272037 | A1 | 10/2012 | Bayer et al. |
| 2012/0303948 | A1* | 11/2012 | Auernhammer ...... H04L 9/3247 713/150 |
| 2013/0054934 | A1* | 2/2013 | Mitsugi ................. G06F 12/109 711/E12.016 |
| 2016/0224474 | A1 | 8/2016 | Harriman |
| 2018/0324181 | A1 | 11/2018 | Serebrin et al. |

FOREIGN PATENT DOCUMENTS

| | | |
|---|---|---|
| CN | 104756091 | 7/2015 |
| JP | 2009-122858 | 6/2009 |

OTHER PUBLICATIONS

Basu et al., "Efficient Virtual Memory for Big Memory Servers," Proceedings of the 40th Annual International Symposium on Computer Architecture, 2013, pp. 237-248.

Combined Search and Examination Report in British Appln. No. GB1813182.1, dated Feb. 14, 2019, 6 pages.

Devcentral, "IOMMU," AMD, Developer Central, Sep. 1, 2008 [retrieved on Apr. 3, 2015]. Retrieved from the Internet: URL<http://developer.amd.com/community/blog/2008/09/01/iommu/>, 4 pages.

Extended European Search Report in European Appln. No. 18212413.1, dated Apr. 11, 2019, 9 pages.

Extended European Search Report in European Appln. No. 20184432.1, dated Sep. 23, 2020, 9 pages.

Gilmont et al., "An Architecture of Security Management Unit for Safe Hosting of Multiple Agents," In Proceedings of the International Workshop on Intelligent Communications and Multimedia Terminals, 1998, pp. 1-12.

International Search Report and Written Opinion in International Appln. No. PCT/US2016/032429, dated Aug. 17, 2016, 11 pages.

John Ousterhout, Virtual Memory, Lecture Notes for CS 140, Stanford University, 2014, pp. 1-4.

McGrew et al., RFC 4543 The Use of Galois Message Authentication Code (GMAC) in IPsec ESP and AH, 2006, IETF, Network Working Group, pp. 1-14.

Office Action in British Appln. No. GB1715263.8, dated Mar. 15, 2018, 3 pages.

Office Action in Chinese Appln. No. 201680019968.6, dated May 11, 2018, 6 pages (with English translation).

Office Action in Chinese Appln. No. 201910110123, dated Dec. 23, 2019, 12 pages (with English translation).

Office Action in European Appln. No. 18212413.1, dated Oct. 21, 2020, 4 pages.

Office Action in Taiwan Appln. No. 106123863, dated Jul. 27, 2020, 10 pages (with English translation).

Office Action in Taiwan Appln. No. 108142552, dated Nov. 16, 2020, 7 pages (with English translation).

Office Action in Taiwanese Appln. No. 105114972, dated Feb. 20, 2017, 13 pages (with English translation).

Pichai et al., "Architectural Support for Address Translation on GPUs," Proceedings of the 19th international conference on Architectural support for programming languages and operating systems, 2014, p. 743-758.

Sang et al., "Exploiting an I/OMMU vulnerability", International Conference on Malicious and Unwanted Software, 2010, pp. 7-14.

Stewin, "Detecting Peripheral-based Attacks on the Host Memory," T-Labs Series in Telecommunication Services, 2015, 4 pages.

Wikipedia.org [online], "Galois/Counter Mode," From Wikipedia, the free encyclopedia, last modified on Oct. 2, 2014 [retrieved on Feb. 9, 2015]. Retrieved from the Internet: URL<https://en.wikipedia.org/wiki/Galois/Counter Mode>, 6 pages.

Willmann et al., "Protection Strategies for Direct Access to Virtualized I/O Devices," ATC'08 USENIX 2008 Annual Technical Conference, 2008, pp. 15-28.

\* cited by examiner

ADDRESS VALIDATION USING SIGNATURES

CROSS-REFERENCE TO RELATED APPLICATION

This application is a continuation of U.S. application Ser. No. 17/572,066, filed Jan. 10, 2022, which is a continuation of U.S. application Ser. No. 16/869,947, now U.S. Pat. No. 11,223,620, filed May 8, 2020, which is a continuation of U.S. application Ser. No. 16/402,561, now U.S. Pat. No. 10,666,652, filed May 3, 2019, which is a continuation of U.S. application Ser. No. 16/031,525, now U.S. Pat. No. 10,326,763, filed on Jul. 10, 2018, which is a continuation of U.S. application Ser. No. 15/661,632, now U.S. Pat. No. 10,027,666, filed on Jul. 27, 2017, which is a continuation of U.S. application Ser. No. 14/867,250, now U.S. Pat. No. 9,749,319, filed on Sep. 28, 2015, which claims priority under 35 U.S.C. 119 to U.S. Provisional Application No. 62/164,288, filed on May 20, 2015. The disclosure of each of the foregoing applications is incorporated herein by reference.

BACKGROUND

This specification relates to validating memory access requests.

Graphics processing units (GPUs) may have highly concurrent accesses to random addresses and may include on-GPU hardware to perform address translation that generates addresses targeting central processing unit (CPU) dynamic random-access memory (DRAM). Similarly, some network interface cards (NICs) and solid state drives (SSDs) may perform their own address translation.

Peripheral component interconnect (PCI) address translation services (ATS) allows a device to request an address translation from an input/output memory management unit (IOMMU) and cache the translation locally on the device. Subsequent accesses to the translated range by the device can be marked as already translated and bypass the IOMMU.

SUMMARY

A memory management unit receives address translation requests from a device, e.g., connected to a motherboard, and generates a signature for each requested physical address. The memory management unit provides the signature to the device and, when receiving memory access requests from the device, uses the corresponding signature to validate the memory location being accessed, validate the device sending the request, or both.

In general, one innovative aspect of the subject matter described in this specification can be embodied in methods that include the actions of receiving, by a component from a device, a plurality of first requests, each of the plurality of first requests for a corresponding physical address and including a corresponding virtual address, for each of the plurality of first requests determining, by the component, a first physical address using the corresponding virtual address, generating a first signature for the first physical address, the first signature for use to validate the first physical address, and providing, to the device, a response that includes the first signature, receiving, from the device, a plurality of second requests, each of the plurality of second requests for access to a corresponding second physical address and including a corresponding second signature, determining, by the component for each of the plurality of second requests, whether the corresponding second physical address is valid using the corresponding second signature, and for each second request for which the second physical address is determined to be valid using the second signature of the corresponding second request, servicing the corresponding second request. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The method may include for each second request for which the second physical address is determined to be not valid using the second signature of the corresponding second request, not servicing the corresponding second request. Not servicing, for a second, different subset of the plurality of second requests, the second request may include denying, for each of the second requests in the second subset, the respective second request. Not servicing, for a second, different subset of the plurality of second requests, the second request may include logging, for each of the second requests in the second subset, a corresponding error indicating the respective second request. Not servicing, for a second, different subset of the plurality of second requests, the second request may include resetting or halting the device. Not servicing the corresponding second request for each second request for which the second physical address is determined to be not valid using the second signature of the corresponding second request may include changing a secret value for the device. Not servicing the corresponding second request for each second request for which the second physical address is determined to be not valid using the second signature of the corresponding second request may include disabling the device's access to a memory. The method may include servicing at least one of the plurality of second requests, and not servicing at least another one of the plurality of second requests.

In some implementations, the method includes receiving a particular request from the device, determining whether the particular request includes a virtual address, and determining whether the particular request is i) one of the plurality of first requests in response to determining that the particular request includes a virtual address or ii) one of the plurality of second requests in response to determining that the particular request does not include a virtual address. Each of the plurality of first requests may include the corresponding virtual address, and an identifier for the device. Generating, for each of the plurality of first requests, the first signature for the first physical address may include determining a secret value using the identifier, generating a hash value using the first physical address and the secret value, and generating the first signature using at least a portion of the hash value.

In some implementations, providing, to the device for each of the plurality of first requests, the response that includes the first signature includes concatenating the first signature and the first physical address, and providing a response that includes the first signature concatenated with the first physical address in a single field of the response. The identifier for the device may include a device bus number for the device. Each of the plurality of second requests may include the corresponding second physical address, the corresponding second signature, and the identifier for the device. Determining, by the component for each of the plurality of second requests, whether the corresponding second physical address is valid using the corresponding second signature may include determining the secret value using the identifier, generating a hash value using the corresponding second physical address and the secret value, generating a third signature using at least a portion of the hash value, determining whether the corresponding second signature and the third signature are the same, and determining that the corresponding second physical address is valid in response to determining that the corresponding second signature and the third signature are the same.

In some implementations, each of the plurality of second requests includes the corresponding second physical address, the corresponding second signature, and the identifier for the device. Determining, by the component for each of the plurality of second requests, whether the corresponding second physical address is valid using the corresponding second signature may include determining the secret value using the identifier, generating a third physical address by decrypting the corresponding second physical address using the secret value, generating a hash value using the third physical address and the secret value, generating a third signature using at least a portion of the hash value, determining whether the corresponding second signature and the third signature are the same, and determining that the corresponding second physical address is valid in response to determining that the corresponding second signature and the third signature are the same.

In some implementations, generating, for each of the plurality of first requests, the first signature using at least a portion of the hash value includes generating the first signature using a predetermined quantity of least significant bits from the hash value. Generating, for each of the plurality of first requests, the first signature using at least a portion of the hash value may include generating the first signature using all of the hash value. Generating the hash value by encrypting the first physical address using the secret value may include determining a cipher text and an authentication tag encrypting the first physical address using the secret value as input to a Galois Message Authentication Code (GMAC) process, and using the authentication tag as the hash value.

In some implementations, the method may include determining at least one permission value for the device using the identifier. Generating the hash value by encrypting the first physical address using the secret value may include determining the hash value by encrypting the first physical address using the at least one permission value. The at least one permission value may include at least one of a read permission bit, a write permission bit, an execute permission bit, a cacheability bit, a cache level hint bit, a transaction class, or a virtual channel number.

In some implementations, each of the plurality of second requests includes an identifier for the device. Each of the second signatures may include an encrypted physical address. Determining, by the component for each of the plurality of second requests, whether the corresponding second physical address is valid using the corresponding second signature may include determining a secret value using the identifier, determining a decrypted value by decrypting the corresponding encrypted physical address using the secret value, determining whether the decrypted value includes a prefix of zeros that has a predetermined length, determining that the corresponding second physical address is valid upon determining that the decrypted value includes the prefix of zeros that has the predetermined length, and using the decrypted value as the corresponding second physical address. Determining the decrypted value by decrypting the corresponding encrypted physical address using the secret value may include determining the decrypted value by decrypting the corresponding encrypted physical address using the secret value as input to a block cipher. Determining the decrypted value by decrypting the corresponding encrypted physical address using the secret value may include determining the decrypted value by decrypting the corresponding encrypted physical address using the secret value as input to an advanced encryption standard process.

In some implementations, receiving, from the device, the plurality of second requests includes receiving, by a switch chip from the device for each of the plurality of second requests, the corresponding second request, determining, by the switch chip for each of the plurality of second requests, that the corresponding second request includes an unknown address, and sending, by the switch chip for each of the plurality of second requests, the corresponding second request to the component.

In some implementations, providing, to the device for each of the plurality of first requests, the response that includes the first signature includes generating, for each of the plurality of first requests, the response using the first signature in an error-detecting code field and the first physical address in a body of the response. Generating, for each of the plurality of first requests, the response using the first signature in the error-detecting code field and the first physical address in the body of the response may include generating an error-detecting code value using the first signature and content from the response other than content from the error-detecting code field, and using the error-detecting code value in the error-detecting code field of the response. Determining, by the component for each of the plurality of second requests, whether the corresponding second physical address is valid using the corresponding second signature may include validating, for each of the plurality of second requests, the corresponding second physical address using the corresponding second signature from an error-detecting code field in the corresponding one of the plurality of second requests. Determining, by the component for each of the plurality of second requests, whether the corresponding second physical address is valid using the corresponding second signature may include validating, for each of the plurality of second requests, the corresponding second physical address and an integrity of the corresponding one of the plurality of second requests using an error-detecting code value from an error-detecting code field in the corresponding one of the plurality of second requests, wherein the error-detecting code value is generated using the corresponding second signature.

In some implementations, servicing, for at least one second request, the corresponding second request includes determining that the second request includes a read request, providing, by the component, a read request to a second device that is associated with the corresponding second physical address, the read request including the corresponding second signature, receiving, from the second device, a second response to the read request, the second response including a destination address and a signature, and determining whether the destination address is valid using the signature. The method may include for each of the at least one second request for which the destination address is determined to be valid using the signature, providing content from the second response to the device, and for each of the at least one second request for which the destination address is determined to be not valid using the signature, discarding the second response. The method may include providing content from the second response to the device for one of the at least one second request, and discarding the second response for another one of the at least one second request.

The subject matter described in this specification can be implemented in particular embodiments and may result in one or more of the following advantages. In some implementations, the systems and methods described below may prevent a device from accessing a physical address outside an approved range for the device, e.g., for devices that perform their own address translation or when the system verifies addresses only at translation time. For instance, a system may verify that a device should be allowed access to an address whenever the device requests access to the address. In some implementations, the systems and methods described below may prevent malicious or erroneous software or hardware of a device from exploiting intentional or accidental flaws in the device to access memory outside of a range the system intended for the device to be permitted to access, e.g., when a device builder is unable to verify that the device silicon matches a design for the device. In some implementations, the systems and methods described below may prevent brute force guessing of signatures because well-behaved devices never emit invalid addresses and the system may halt, reset, or both, a device the first time that device provides the system with an invalid address.

In some implementations, the systems and methods described below may allow the system to validate a device's memory access request without accessing a mapping of valid addresses for the device for each request by relying on the storage of the address, a signature for the address, or both, in the device without relying on the device to be trusted to generate only valid addresses. In some implementations, the systems and methods described below may require less memory storage space based on the number of secret values required compared to other systems, e.g., with translation lookaside buffers. In some implementations, the systems and methods described below may help limit the number of components in a system that need to be trusted, e.g., to a central processing unit (CPU) and the components on the same chip as the CPU, may be implemented without changes to existing hardware or all existing hardware, or both. In some implementations, a component may use multiple keys for a single device, an index, or both, to remove the device's access to some memory locations but not all memory locations to which the device previously had access.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

Figure 1:
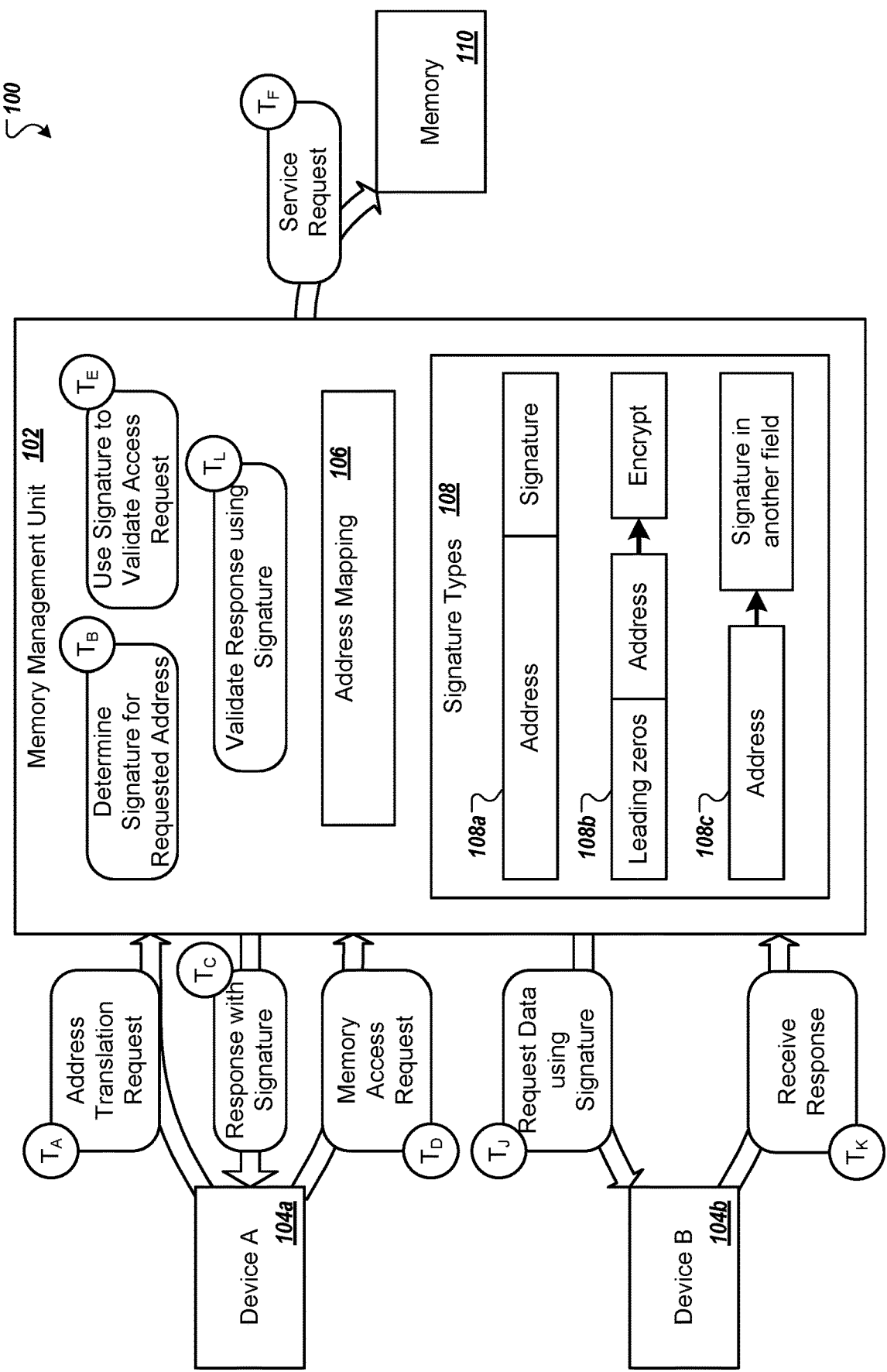
FIG. 1 is an example of an environment in which a memory management unit generates and provides signatures for physical addresses to multiple devices.

In some implementations, an input/output memory management unit (IOMMU), e.g., in a peripheral component interconnect (PCI) root complex, generates a signature for each address translation request from a device using a randomly generated secret value, to which only the IOMMU has access, as part of a cryptographic key. The IOMMU provides the signature to the device and the device must provide the IOMMU with the signature in any future requests to access the translated physical address so that the IOMMU can validate and accept or reject the access request, e.g., with a simple computation. The IOMMU may use the signature to prevent the device from spoofing any other physical addresses or replaying invalidated addresses, e.g., for accessing memory outside of a permitted range for the device. The IOMMU may encode the signature, e.g., cryptographic signature, in the address or another field of a packet, e.g., a PCI express (PCIe) packet, provided to the device.

For instance, a device may receive a translated address from a memory management unit (MMU) which the MMU determines using PCI standard device address translation or MMU device driver address map operations that populate in-device page table entries. In some examples, the MMU may invoke MMU driver code to allocate a device virtual address that is unique per device, and create MMU page table mappings translating that virtual address to the specified central processing unit (CPU) physical address.

For example, when the MMU creates the page table mapping, the MMU adds a signature to each of the physical addresses in the mapping. Subsequently, when the device requests a translation from the MMU via address translation services (ATS), the MMU provides the signature or both the signature and the address to the device. In some examples, the MMU device driver may send the virtual and physical addresses, including the signatures, to the device, e.g., so the device includes local page tables and does not need to request a translation from the MMU.

In some implementations, a system may rely on mechanisms that prevent a device from spoofing part of the device's identity when generating a signature. For instance, a PCIe device identifier may be a 16-bit tuple called Bus/Device/Function (BDF) numbers and PCI's access control services (ACS) may prevent a device from changing the device's bus number. The MMU may use the device's bus number when generating a signature, e.g., by replacing a physical address provided to a device with a tuple: "Address, Hash (MMU secret value, physical address, read permission bit, write permission bit, execute permission bit, device bus number)". In some implementations, the MMU may use other bits or values as input to the hash function in addition to or instead of those above. In some examples, the address and the signature together may be sixty-four bits. The MMU may use any appropriate method to generate the signature, including additional methods described below.

In some examples, when addresses, e.g., PCIe addresses, can encode sixty-four bits to identify each address, and typical page allocation granularities are 4 KB, 2 MB, and 1 GB, a system may use the fifty-three, forty-four, or thirtyfive most significant or least significant bits of each page granularity for each respective page size to generate a signature. In some examples, the MMU may provide 4 KB-sized translations with fifty-three bits for a signature, e.g., so the MMU does not have to determine the original page translation size, or calculate three signatures, each with different low order bits masked out of the hash calculation. In some implementations, the MMU may add a page size indication in the response, e.g., the PCIe packet, and include that field in the hashed data, e.g., and use the page size to determine the number of bits used for the signature and the number of bits that represent the address.

The device includes the signature for a particular physical address in each memory access request for that particular physical address, e.g., which normally contains the particular physical address and the device's BDF. For instance, during runtime, the device will send a particular physical address and the signature in every memory transaction for the particular physical address.

The MMU, e.g., in a PCIe root complex, can begin processing the request while verifying the signature in parallel, and can abort processing of the request if the MMU determines that the signature is invalid, e.g., and halt, reset, or both, the device the first time the MMU receives an invalid address from the device. In some examples, when the MMU detects an invalid address or periodically, the MMU may rotate the secret value to effectively destroy all usable knowledge the attacking device may have. For instance, the secret value may be a per-device secret value and the MMU may change only the secret value for the device that provided the MMU with an invalid address. In some examples, the MMU may have two secret values for each device, e.g., for secret value rotation.

In some implementations, the MMU may receive the secret value from an operating system or a hypervisor, e.g., hypervisor driver code. In some implementations, the MMU may generate the secret value internally, e.g., and never expose the secret value directly to software. The system may use any appropriate method to generate the secret value.

Signature Generation and Validation

FIG. 1 is an example of an environment 100 in which a memory management unit 102 generates and provides signatures for physical addresses to multiple devices A-B 104a-b. For instance, the memory management unit 102 may receive, at time $T_A$, an address translation request from the device A 104a and use an address mapping 106 that associates virtual addresses, such as a virtual address included in the address translation request, with physical addresses.

The memory management unit 102 then determines a signature for the requested address at time $T_B$. The memory management unit 102 may have previously generated the signature, e.g., when creating the address mapping 106 for the device A 104a and stored the signature in the address mapping 106, or may generate the signature in response to receipt of the address translation request. The memory management unit 102 may determine a signature type 108 for the requested address, e.g., using the virtual address in the address translation request, the corresponding physical address, the device A 104a from which the memory management unit 102 received the address translation request, functionality of the memory management unit 102 or the device A 104a from which the memory management unit 102 received the address translation request, or any other appropriate method including a combination of two or more of these.

In some implementations, the memory management unit 102 may generate a signature for the physical address using a secret value, the physical address, and a read permission bit, a write permission bit, an execute permission bit, or a device bus number for the device A 104a. The secret value may be specific to the memory management unit 102 and, optionally, the device A 104a. When the secret value is specific to the memory management unit 102, and a device sends an invalid access request to the memory management unit 102, e.g., that has an invalid address, invalid signature, or both, the memory management unit 102 may reset the secret value and determine new signatures for all addresses for which devices have access. When the secret value is specific to a particular device, e.g., the device A 104a, and the particular device send an invalid access request to the memory management unit 102, the memory management unit 102 may reset the secret value and determine new signatures for all addresses for which the particular device has access, and not the addresses for which other devices have access. In some examples, the memory management unit 102 may use a secret value specific to both the memory management unit 102, and not other memory management units, and that is also specific to a particular device, e.g., the device A 104a. In these examples, the particular device sends data access requests only to the memory management unit 102 and not another memory management unit that does not have the secret value used to determine a signature in the request.

The memory management unit 102 may determine permissions for the device A 104a and use one or more of those permissions, e.g., read, write, or execute, to generate the signature. In some examples, the memory management unit 102 may use any number of mode or permission bits for the device A 104a, such as one or more of a cacheability bit, a cache level hint bit, a transaction class, or a virtual channel number. The memory management unit 102 may use a hash function, e.g., a strong cryptographic hash function, to generate the signature.

The memory management unit 102 may select a hash function to generate a signature and include the signature with the address 108a, e.g., appended or concatenated to the end or the beginning of the address, in a response provided to the device A 104a at time $T_C$ so that the device A 104a will include the signature in any requests for access to the memory location identified by the physical address 108a. For instance, at time $T_D$, the device A 104a would include the signature in a request for access to the memory location specified by the address 108a.

When the memory management unit 102 receives the address 108a from the device A 104a, at time $T_D$, the memory management unit 102, at time $T_E$, validates the address using the signature to ensure that the address, the signature, or both, have not be modified by the device A 104a, that another device does not use the address 108a, and that the requesting device A 104a should be allowed access to the corresponding memory location. For example, the memory management unit 102 may verify that only the device A 104a provides the address 108a to the memory management unit 102, and not the device B 104b, using the signature and the device bus number or the secret value for that particular device or both.

In some implementations, the memory management unit 102 may validate the address, or the request, using the signature by generating a new signature for the address and comparing the new signature with the signature from the request to determine whether the signatures match. If the signatures match, the memory management unit 102 determines that the address, and the request, are valid. If the signatures do not match, the memory management unit 102 determines that the address, and the request, are not valid. The memory management unit 102 may perform any appropriate method to determine whether an address, and a corresponding request, are valid using the signature included in the request.

Upon validating the access request, the memory management unit 102, at time $T_F$, may service the request or cause the request to be serviced, e.g., by another component. For instance, the memory management unit 102 may allow the device A 104*a* access to a memory 110 that includes a location identified by the physical address in the memory access request.

When the memory management unit 102 determines that the address, the signature, or both have been modified, or that another device provided the address 108*a* to the memory management unit 102, e.g., the device B 104*b*, the memory management unit 102 does not service the request, e.g., and may reset or cause the resetting of one or both of the devices A-B 104*a-b*. For instance, when the address or the signature have been modified, the memory management unit 102, or another component in the environment 100 such as a PCIe root complex, resets the device A 104*a*. In some examples, if the memory management unit 102 determines that the device B 104*b* provided the address 108*a* to the memory management unit 102, when the memory management unit 102 provided the address 108*a* to the device A 104*a*, the memory management unit 102 may reset or cause the resetting of the device B 104*b*, the device A 104*a*, or both.

When the memory management unit 102 resets a device, or causes the device to be reset, the memory management unit 102 may change the secret value for the device. In some examples, when the memory management unit 102 changes the secret value for the device without resetting the device, the memory management unit 102 may provide updated signatures to the device, e.g., to prevent the memory management unit 102 from receiving a request with a signature generated using a previous secret value and determining that the request is invalid. For instance, the memory management unit 102 may provide an updated page table to the device.

In some implementations, the memory management unit 102 may use an advanced encryption standard (AES) process to generate the signature. For instance, the memory management unit 102 may use a Galois/Counter Mode (GCM) as a ten round AES-128 encryption process to generate the signature. The memory management unit may use a Galois Message Authentication Code (GMAC) process to generate the signature. The memory management unit 102 may use the physical address, the secret value for the device, the permissions of the requesting device, and the bus number of the requesting device as input to the AES-GCM process, e.g., in additional to any other appropriate input values. In some examples, the memory management unit 102 may use a resulting tag, e.g., an authentication tag or a GMAC tag, as the signature, e.g., and discard the resultant cipher-text.

In some implementations, the memory management unit 102 may generate a signature using a prefix of zero bits included in an address 108*b* at time $T_B$. For instance, the memory management unit 102 may determine the number of leading zero bits included in the address 108*b*, encrypt the address 108*b*, e.g., using a secret value for the memory management unit 102 or the requesting device A 104*a* and possibly other values such as access bits or values as described above, and provide the encrypted address to the requesting device at time $T_C$.

During validation, at time $T_E$, in response to a request to access memory corresponding to the encrypted address, the memory management unit 102 decrypts the address, e.g., using the secret value and the other values, and determines whether the number of leading zero bits included in the decrypted address 108*b* is correct. If the number of leading zero bits is correct, the memory management unit 102 services the request at time $T_F$. If the number of leading zero bits does not match the number of leading zero bits that were originally included in the address, e.g., and is incorrect, the memory management unit 102 does not service the request and may reset or halt, or cause the resetting or halting, of the device.

In some examples, the memory management unit 102 may use a block cipher to encrypt the address 108*b*. For instance, the memory management unit 102 may use a block cipher with an eight byte block size or AES in counter mode with the address 108*b* as input to the nonce generation. When the memory management unit 102 uses a counter, e.g., a counter per secret value, the memory management unit 102 includes the current value of the counter used in the encryption process in a response sent to the device A 104*a*, at time $T_C$, e.g., so that the memory management unit 102 can use the counter value during the decryption process. The memory management unit 102 may use the secret value as input to the block cipher. The memory management unit 102 may use any appropriate method to encrypt the address 108*b* and a corresponding method to decrypt the encrypted address.

In some implementations, the memory management unit 102 may generate a signature for an address 108*c*, at time $T_B$, and store the signature in another field of a response provided to the requesting device, e.g., the device A 104*a* at time $T_C$. In some examples, the memory management unit 102 may store the signature in a response checksum, e.g., defined by PCIe to detect noise on electrical signaling wires. For instance, the memory management unit may generate a transaction layer packet digest for a response packet and include the physical address in the body of the response packet. The memory management unit may include the signature in the transaction layer packet digest, e.g., appended to the end of the digest as a link cyclic redundancy check (LCRC), and the requesting device receives the response packet.

When the requesting device A 104*a* needs to access the memory location specified by the physical address, the requesting device A 104*a* provides the response packet, with the transaction layer packet digest and the signature, to the memory management unit 102 at time $T_D$, potentially routing the packet through one or more switches. The memory management unit 102 uses the signature, located in the checksum, to validate the address at time $T_E$ and ensure that the address, the signature, or both, have not been modified or corrupted and that the request should be serviced.

In some implementations, the response packet may include setting data that indicates whether or not the checksum is present. For instance, a component or device may typically use the checksum to determine whether the response packet has been corrupted. In these implementations, any switches or other components that pass the packet from the requesting device A 104*a* to the memory management unit 102 are prevented from using the checksum to determine whether the packet has been corrupted, e.g., the setting data may indicate that the checksum is not present although the signature is stored in the checksum location. The memory management unit 102 or another component in the environment may use any appropriate method to ensure that intermediate components that pass a packet to the memory management unit 102 or from the memory management unit 102 to the requesting device A 104a do not use the signature in the checksum field to determine whether the packet has been corrupted.

In some implementations, the memory management unit 102 may generate a checksum using a signature and the contents of a packet and store that checksum in the packet. The memory management unit 102 may then verify both the contents of the packet and the signature of the address using the checksum. For instance, when the memory management unit 102 receives a request for a memory access from the device A 104a, the memory management unit 102 may generate a signature using the address in the request and use the signature and the address to generate a new checksum. If the new checksum matches the checksum included in the request, the memory management unit 102 services the request, or has the request serviced, e.g., and has validated both the address and the integrity of the packet. If the new checksum does not match the checksum included in the request, the memory management unit 102 ensures that the request is not serviced.

When the memory management unit 102 determines that a memory access request for a physical address does not include a signature, the memory management unit 102 does not service the request. For instance, when a malicious device sends a physical address or a spoofed physical address, e.g., an invalid physical address, to the memory management unit 102 for access to memory corresponding to the physical address, and the memory management unit 102 determines that the malicious device did not include a signature in the request. The memory management unit 102 may reset the malicious device or halt the malicious device or cause the resetting or halting of the malicious device. The memory management unit 102 may determine that the address in the request is not a virtual address before determining whether the request includes a signature, e.g., as described in more detail below.

Inter-Device Requests

In some examples, when the memory management unit 102 services a request, the memory management unit 102 may provide the request to another device B 104b at time $T_J$. In these examples, the request may be a read request or a write request. The memory management unit 102 may provide the signature of the requested address in the request sent to the other device B 104b. For instance, when the memory management unit 102 forwards the request received from the device A 104a to the other device B 104b, the forwarded request may include the signature for the requested address or the destination address, e.g., of the device A 104a. The memory management unit 102 may include the signature in the address field, in a header, or both, of the request.

The other device B 104b determines data responsive to the request and provides a response to the memory management unit 102 at time $T_K$. The other device B 104b includes the signature from the request in the response, e.g., in the body, the header, or both. For instance, the other device B 104b may include the signature in a destination address of the response, in a checksum for the response, in a body of the response, or a combination of two or more of these, as described in more detail below.

The memory management unit 102 receives the response and validates the response using the signature at time $T_L$. For instance, the memory management unit 102 validates the response using one of the methods described above to uniquely connect the response, e.g., the destination address, to the requesting device A 104a. The memory management unit 102 may validate the destination address, e.g., of the requesting device A 104a, the address for the requested data, or both.

Upon validating the response, the memory management unit 102 provides the response to the device A 104a. When the memory management unit 102 determines that the response is not valid, the memory management unit 102 does not provide the response to a destination identified in the response. The memory management unit 102 might not provide the response to the destination, e.g., may destroy the response, to prevent unsolicited responses from being sent to devices, e.g., as part of a denial of service attack.

In some implementations, when forwarding a request to another device, the memory management unit 102 may provide a request to the other device B 104b at time $T_J$ that includes a signature for both the requesting device A 104a and the other device B 104b that will service the request. For instance, the memory management unit 102 may determine two signatures, one for each of the devices, using the device's corresponding secret value, corresponding bus number, and the physical address of the memory location to be accessed.

The other device B 104b will then respond to the request with data responsive to the request and both signatures, either in the body of the response, in a header, or both, e.g., one signature in the body and another signature in the header. The memory management unit 102 then uses both signatures to validate the response and only provides the response to the requesting device in response to validation using both signatures. This may prevent the other device B 104b from sending "responses" to requests that were never provided to the other device B 104b.

In some implementations, when devices may communicate in a peer-to-peer environment, e.g., without a memory management unit monitoring the communications, each of the devices may generate signatures and perform validation similar to the validation described above. For instance, the requesting device A 104a may request an address translation for a virtual address from the other device B 104b and receive a signature, with or without an address, in response. The requesting device A 104a may then send a request for access to a corresponding physical memory location to the other device B 104b and include the signature with the request. The other device B 104b then validates the request using the signature and only responds to the request in response to determining that the request is valid.

In some examples, a request sent from the requesting device A 104a may include two signatures, one of which the other device B 104b uses to validate the request and the other which the requesting device A 104a uses to validate the response. For instance, the first signature may be included in the address field of the request and the other device B 104b may use the first signature to determine whether the request is valid. The second signature may be included in a header of the request such that the other device B 104b includes the second signature in the response and the requesting device A 104a determines whether the response is valid using the second signature. When the device A 104a receives a "response" that does not include a signature, e.g., in the header, the device A 104a rejects the response, e.g., by discarding the data.

Example Process Flow

Figure 2:
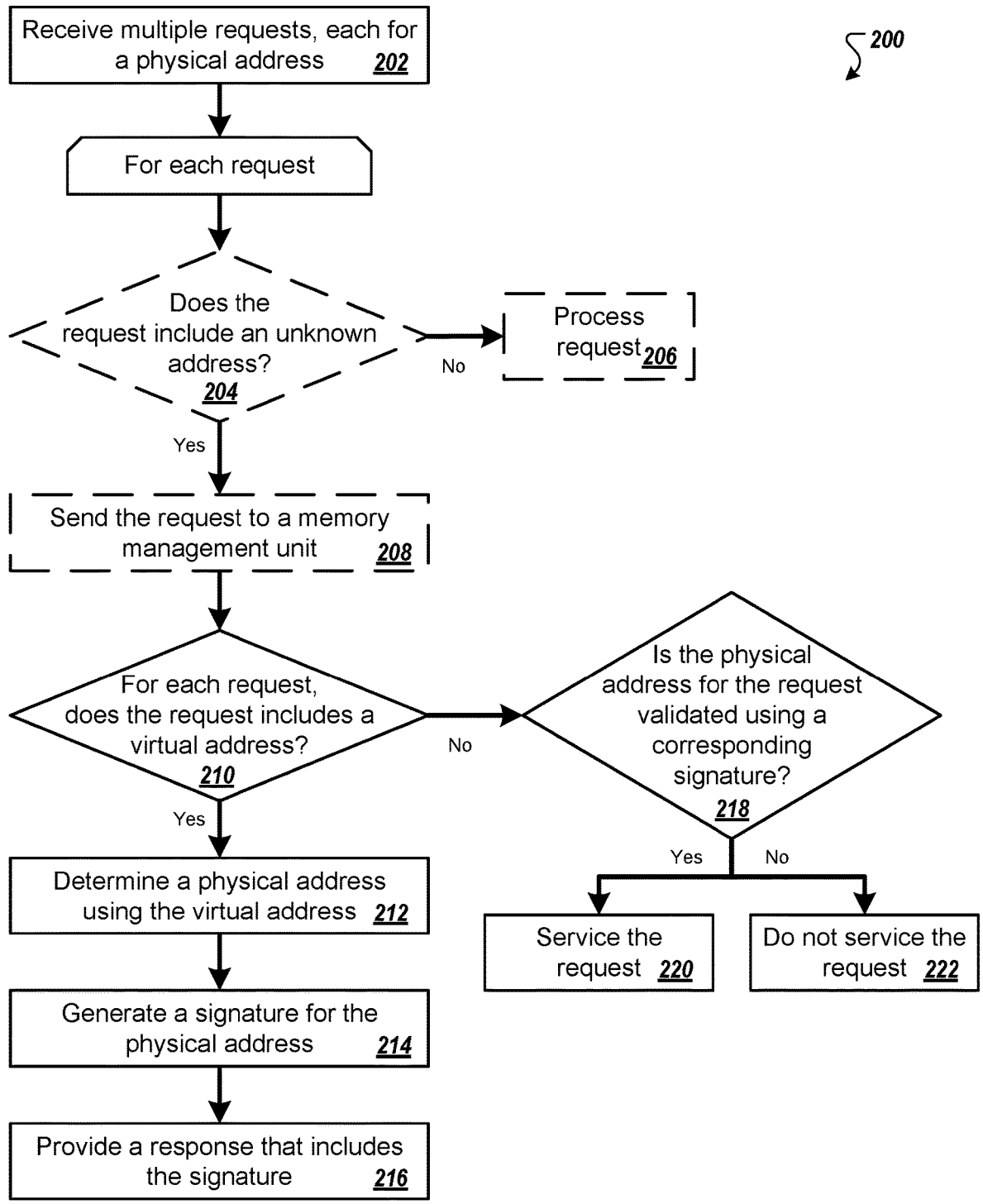
FIG. 2 is a flow diagram of a process for processing requests.

FIG. 2 is a flow diagram of a process 200 for processing requests. For example, the process 200 can be used by the memory management unit 102 from the environment 100.

A system receives multiple requests, each for a physical address (202). For instance, a memory management unit, a switch, or a root complex receive the requests.

For each request, the system determines whether the request includes an unknown address (204). For example, when a component such as a switch chip receives the request, the switch chip may determine that the switch chip does not recognize the address and should forward the address to a memory management unit, e.g., included in the switch chip or another component such as a root complex.

In some examples, when the switch chip is included in a motherboard, the switch chip may receive a request that includes an address from a device, e.g., a video card. The switch chip may determine that it does not know a destination for the address included in the request, e.g., the address is a virtual address or includes a signature, and that the address is unknown. The switch chip may then determine whether or not to forward the request to a memory management unit for processing, e.g., translation from a virtual address to a physical address or validation using a signature included in the address.

In response to determining that the request does not include an unknown address, the system processes the request (206). For instance, the component services the request, e.g., by forwarding the request to another device or component which may have data responsive to the request.

In response to determining that the request includes an unknown address, the system sends the request to a memory management unit (208). For example, the switch chip sends the request to the memory management unit because the switch chip is unable to determine the destination of the request using the destination address in the request.

The system determines whether the request includes a virtual address (210). For instance, the component determines whether an address type field indicates that the request includes a virtual address or a physical address. In some examples, when the request is a PCIe request, an address type field may have a first encoding for non-translated virtual address, a second encoding for a translation request, e.g., that includes a virtual address, and a third encoding for a translated address, e.g., that includes a physical address.

In response to determining that the request includes a virtual address, the system determines a physical address using the virtual address (212). For example, the component uses a mapping that associates virtual addresses with physical addresses, e.g., a page table, to determine the physical address.

The system generates a signature for the physical address (214). For instance, the component uses one of the methods described in this specification to generate the signature and stores the signature in an address field, e.g., body, of a response, a header of the response, or both. The component may use an identifier of the device to determine a secret value to use when generating the signature. In some examples, the component may use a general secret value, e.g., specific to the component, that is not specific to any particular device.

In some examples, the system may generate a hash using two or more of the physical address, a secret value for the component, a secret value for the device, an identifier for the device, e.g., a device bus number, a read permission bit, a write permission bit, an execute permission bit, or other appropriate values associated with either the component or the device or both. The system may use all or a portion of the hash as the signature, e.g., a predetermined number of the most significant bits or the least significant bits. In some examples, the identifier for the device may be particular to the function of the device. In some implementations, the identifier for the device may be one or more of the bus, device, or function numbers for the device, e.g., as specified by PCIe.

In some implementations, the component may generate a signature for a physical address, concatenate the signature to the physical address, and encrypt the concatenated signature and physical address. The component may place the encrypted concatenated signature and physical address in the response. In some examples, the component may encrypt the physical address, generate a signature for the encrypted physical address, and place the encrypted physical address, or the plaintext version of the physical address, in a response with the signature. The physical address and the signature of the encrypted physical address may be in the same field of the response, e.g., the body, or may be in different fields, e.g., the physical address, encrypted or plaintext, may be in the body and the signature may be in a header of the response.

The system provides a response that includes the signature (216). For example, the component provides the response to the requesting device. The response may include a plaintext physical address with a signature, e.g., both in the body field of the response or with the signature in a header. The response may include an encrypted physical address with a signature, e.g., both in the body field of the response or with the signature in a header. The response may include an encrypted physical address in the body of the response such that a decrypted version of the physical address includes a known good value in a predetermined portion of the physical address, e.g., the upper N most bits of the plaintext address must all be zeros. In some examples, N is thirty-two bits.

In response to determining that the request does not include a virtual address, the system determines whether the physical address for the request is validated using a corresponding signature (218). For instance, the component generates a signature for the physical address and compares the newly generated signature with a signature included in the request to determine whether the two signatures are the same.

In some implementations, the component may use an identifier of the requesting device, included in the request, to determine a secret value for the device, or the component may use a general secret value when the component does not have per-device secret values. The component then generates a signature for the physical address using the same method the component previously used to generate the signature included in the request, e.g., using the secret value, and then compares the newly generated signature with the signature included in the request to determine whether or not the physical address, and the request, are validated.

In some implementations, when the signature is a predetermined number of zeros in an address, the component may determine that the address is validated by decrypting an encrypted physical address included in the request and comparing a number of consecutive zeros in the decrypted address, e.g., at the beginning or end of the physical address, with a known value, e.g., that specifies the number of consecutive zeros that should be in the address. If the number of consecutive zeros in the decrypted address is the same as the known value, the component determines that the signature and the request are validated. If the number of consecutive zeros in the decrypted address is not the same as the known value, the component determines that the signature and the request are not validated.

In response to determining that the physical address for the request is validated using the corresponding signature, the system services the request (220). For example, the component forwards the request to a destination device or component.

In response to determining that the physical address for the request is not validated using the corresponding signature, the system does not service the request (222). For instance, the component may deny the request, reset or halt the device that sent the request to the component, log an error that identifies the request, e.g., in an error log, change a secret value for the requesting device, disable the requesting device's access to a memory, or any combination of two or more of these. In some implementations, a switch chip or a root complex disable the requesting device's access to a memory in response to a message from a memory management unit, e.g., when the memory management unit determines that the request should not be serviced.

The order of steps in the process 200 described above is illustrative only, and the processing of the requests can be performed in different orders. For example, the system may generate a signature for the physical address, e.g., perform step 214, before receiving a request for a translation of a virtual address to a physical address, e.g., step 202.

In some implementations, the process 200 can include additional steps, fewer steps, or some of the steps can be divided into multiple steps. For example, the component may perform steps 202, 210 and 218 through 222 without performing the remaining steps. In some examples, the component may perform steps 202 and 210 through 216 without performing the remaining steps. In some implementations, the process 200 might not include steps 204 through 208.

In some implementations, a first component, e.g., a switch chip, may initially receive each of the requests and then forward the requests to a second component, e.g., a memory management unit, for instance, as part of step 202. The first component may determine that each of the requests includes an unknown address, e.g., a virtual address or an address with a signature, and then provide the request to the second component, e.g., a memory management unit. In some implementations, a first component may perform steps 202 and 204 and, optionally for some of the requests perform step 206, and then forward requests not processed using step 206 to a second component for processing. The first component and the second component may communicate to service or not service the request, e.g., when the request is denied or a requesting device is halted.

In some implementations, when a memory management unit in a switch chip performs the steps in the process 200, the memory management unit may convert a request that includes a signature into a "standard" request, e.g., without a signature, before sending the request to another device or component for processing. For instance, after determining that a request is validated, the memory management unit may convert the request to include only the physical address and no signature and forward the converted request to another device or component, e.g., a root complex, for processing. In some examples, a memory management unit converts the request to a standard request without a signature before forwarding the request to a destination device no matter where the memory management unit is located in a system, e.g., whether or not the memory management unit is part of a switch chip, a root complex, or another component. The memory management unit may mark a packet that includes the request as "address translated" before sending the request to another device, e.g., a root complex.

Optional Implementation Details

In some implementations, a memory management unit may balance the probability a device may successfully determine a signature on a first attempt with the length of the signature, e.g., a shorter signature. For instance, if the memory management unit uses a cryptographic process and the signature is N bits long, then the device has a $1/2^N$ probability of guessing a valid signature for an address or permissions for which the device should not be allowed access depending on the cryptographic process used. The device may store valid addresses and valid signatures and have some form of known plaintext attack available using the valid addresses and valid signatures.

In some examples, the memory management unit may truncate the address, e.g., by removing unnecessary bits, such as zeros. For instance, when the memory management unit uses sixty-four bit addresses, the memory management unit may create a sixteen bit signature, e.g., by removing the leading sixteen bits from a corresponding address, and use forty-eight bits for the address. When receiving a request for access to a memory location, the memory management unit may generate a new signature using the forty-eight bits of the address and compare the new signature with the signature included with the address to determine whether the two signatures match. If the two signatures match, the memory management unit may process the request. If the two signatures do not match, the memory management unit does not process the request, e.g., and may reset, halt, or both, the requesting device.

In some implementations, when a component, e.g., a PCIe switch chip, routes memory access requests by address, the component that performs the routing may perform the validation. In some examples, when the component that performs the routing receives an unknown address, e.g., that contains a signature and a truncated address, the component that performs the routing may forward the unknown address to a memory management unit, e.g., a PCIe root complex that includes the memory management unit, for processing.

In some implementations, an environment may include a configurable partition between bits for an address and bits for a signature such that the configurable partition may be adjusted to achieve a desired probability of a device guessing a valid signature. For instance, in an environment that includes 1 TB of random access memory (RAM), a memory management unit may use twenty-four bits for the address. The memory management unit may adjust the size of the signature based on the size of the RAM or another memory in the environment. For example, the memory management unit may determine the size of the signature when a computer that includes the memory management unit is initially turned on.

In some implementations, a memory management unit generates a signature upon receiving a request for a translation of a virtual address to a corresponding physical address. In some implementations, a memory management unit generates signatures for all physical addresses when providing a device with corresponding virtual addresses or in response to receiving identification of the virtual addresses for the device. In these implementations, the memory management unit may store the signatures in an address mapping. In some examples, the memory management unit may provide the address mapping to the device and include the signatures in the address field of the address mapping.

In some implementations, a memory management unit provides a single signature to a device, e.g., in response to a request for a corresponding physical address. In some implementations, a memory management unit provides multiple signatures to a device at a time, e.g., for a block of physical addresses or for all physical addresses to which the device has access. The memory management unit may provide multiple signatures to a device in response to detecting the device.

In some implementations, a memory management unit may provide only a signature to a requesting device in response to an address translation request, e.g., when the address is encrypted. In some implementations, a memory management unit may provide both a signature and an address to a requesting device in response to an address translation request.

In some implementations, the memory management unit may use two or more of the methods described above to generate a signature. For instance, the memory management unit may store part of a signature in an address field of a packet and part of the signature in a header field, e.g., a checksum field. In some examples, the memory management unit may determine a number of leading zeros, encrypt the address, determine a signature of the encrypted address, and store the signature in a header field, e.g., a checksum field, of a packet that includes the encrypted address in the body. When determining whether the address is validated for an access request, the memory management unit may generate a new signature, compare the new signature with the signature included in the access request, decrypt the address, determine the number of leading zeros in the decrypted address, and only service the request when both the number of leading zeros in the decrypted address is correct and the new signature and the signature included in the access request are the same.

In some implementations, a component other than a memory management unit, or an input/output memory management unit, may generate and validate signatures or perform some of the steps above. For instance, a switch, a root complex, or a central processing unit may generate and validate signatures. In some examples, a single type of component, e.g., a memory management unit, may generate signatures and multiple different types of components may validate the signatures, e.g., both memory management units and switches.

A physical system may include multiple memory managements units and other components that generate and validate addresses. In these examples, particular components may generate, validate, or both, addresses for particular devices. In some implementations, components may share secret values for a particular device to allow multiple components to generate, validate, or both, signatures for the particular device.

In some implementations, a component may include multiple keys for a single device. For instance, the component may use different keys to generate and validate different addresses for the device. When a system removes access for the device to some of the addresses, the component removes or changes the key for those addresses, potentially invalidating other addresses as well. To minimize the number of addresses which are invalidated, the component uses multiple keys so that only the addresses with the same key are invalidated, and may need to be re-signed if the device still has access to some of those addresses, while addresses signed and validated with other keys do not need to be re-signed.

For example, when a device is a graphics processing unit or another device that uses a large memory allocation, the device may have a large number of pages, a portion of which are persistent and another portion of which rapidly churn and invalidate quickly. For instance, the device may have persistent access to the portion because of garbage collection. In these examples, a component may use a first key for a first subset of addresses, e.g., to which the device will continue to have access, and a second key for a second subset of addresses, e.g., that invalidate quickly. The component may then change the second key when the device no longer has access to one or more of the addresses to prevent the device from accessing corresponding memory locations identified by the addresses in the second subset of addresses.

The component may use more than two keys to enable further refinement of key rotation. For example, the component may use a first key, or two first keys, for a first subset of addresses for which the device will continue to have access, and ten second keys for a second subset of addresses for which the device will only have temporary access or for which the contents of the corresponding memory locations quickly change as the memory is overwritten by other components or devices. The component may rotate the second key or any of the second keys more quickly than the first key or the first keys.

The component may include an index identifier in a signature to determine which key to use for a particular address. For example, the component may keep the keys in an array and include the index identifier in a signature when generating a signature, e.g., at the beginning or the end of the signature. When the component receives a memory access request, the component determines the index identifier from the signature and uses the index identifier to determine a location in the array that includes the key to use when validating the memory access request, e.g., and the address included in the memory access request.

In some examples, the component may use an identifier in a page table, e.g., a page table entry, that indicates which key to use for a particular address. The component may set the identifier when creating a signature for an address and use the identifier to determine which key to use when validating the address. The component may use the identifier when using a single key for each device, e.g., to determine which key to use for each device, or when using multiple keys for one or more devices, or both.

In some implementations, a component may use an index instead of multiple keys for a single device to allow invalidation of a subset of addresses to which a device has access while allowing the device to continue to access another subset of addresses. For instance, a portion of a signature may be an index which the component uses to determine whether the device has access to a corresponding memory location. When the component receives a memory access request, the component determines whether a corresponding location in a buffer contains a predetermined value. If the corresponding location in the buffer contains the predetermined value, and the component validates the signature, the component allows the device access to the corresponding memory location. If the corresponding location in the buffer does not contain the predetermined value, or the component does not validate the signature, the component does not service the memory access request, e.g., the component prevents the device from accessing the corresponding memory location.

In some examples, the component may reserve a first set of indices for addresses to pages for which the device will continue to have access and a second set of indices for addresses to pages for which invalidate quickly for the device. A number of indices in the second set of indices may be greater than a number of indices in the first set of indices.

The component may use a bit vector with one bit per index value. To allow the device access to memory locations associated with a particular index, e.g., which include a particular index value representing a location of the particular index in the bit vector, the component sets a value of the location of the particular index in the bit vector to a predetermined value, e.g., one. When the component generates a signature using the key for the device, the component includes the particular index value in the signature, e.g., at the beginning or the end of the signature. When the component receives a memory access request from the device, the component determines whether a location in the bit vector that corresponds to the particular index value, retrieved from the signature included in the memory access request, is the predetermined value or not. When the location in the bit vector is the predetermined value and the component validates the memory access request, the component allows the memory access request to be serviced. When the location in the bit vector is not the predetermined value or the component does not validate the memory access request, the component prevents the memory access request from being serviced.

In some examples, the component may use both multiple keys for a single device and an index to determine whether or not the single device should have access to a particular memory location. For instance, the component may use a first bit in a page table entry to indicate which key was used to generate a signature for a corresponding address and a second bit in the page table to indicate which index was used to allow the device access to corresponding memory locations.

In some implementations, when a device caches addresses locally, a component may invalidate an address, e.g., for a memory location to which the device no longer has access, by sending an ATS invalidation message to the device, or any other appropriate type of message. In some implementations, a component may invalidate an address to change a key, an index, or both, that are associated with the address.

For instance, when a component associates each address in a first subset of addresses to which a device has access with a particular key, a particular index, or both and determines that the device should not be able to access a memory location identified by a first address from the first subset of addresses, the component may change the key, the index value, or both. To allow the device to continue to access one or more other memory locations identified by other addresses in the first subset of addresses, the component sends an invalidation message to the device for the addresses, e.g., a second address, generates a new signature for the addresses, if necessary, or changes the index to a new index value, or both, and sends another message to the device with the new signature, the new index value, or both. Then when the component receives an access request for one of the other addresses, e.g., the second address, the component validates the access request, assuming that the new key, the new index, or both, are still valid. The component may assign the other addresses to a second subset of addresses which may or may not initially include other addresses, e.g., the component may assign the second address to a key or an index, or both, that are already used for a third address or that is not yet being used for any addresses.

Additional Implementation Details

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Figure 3:
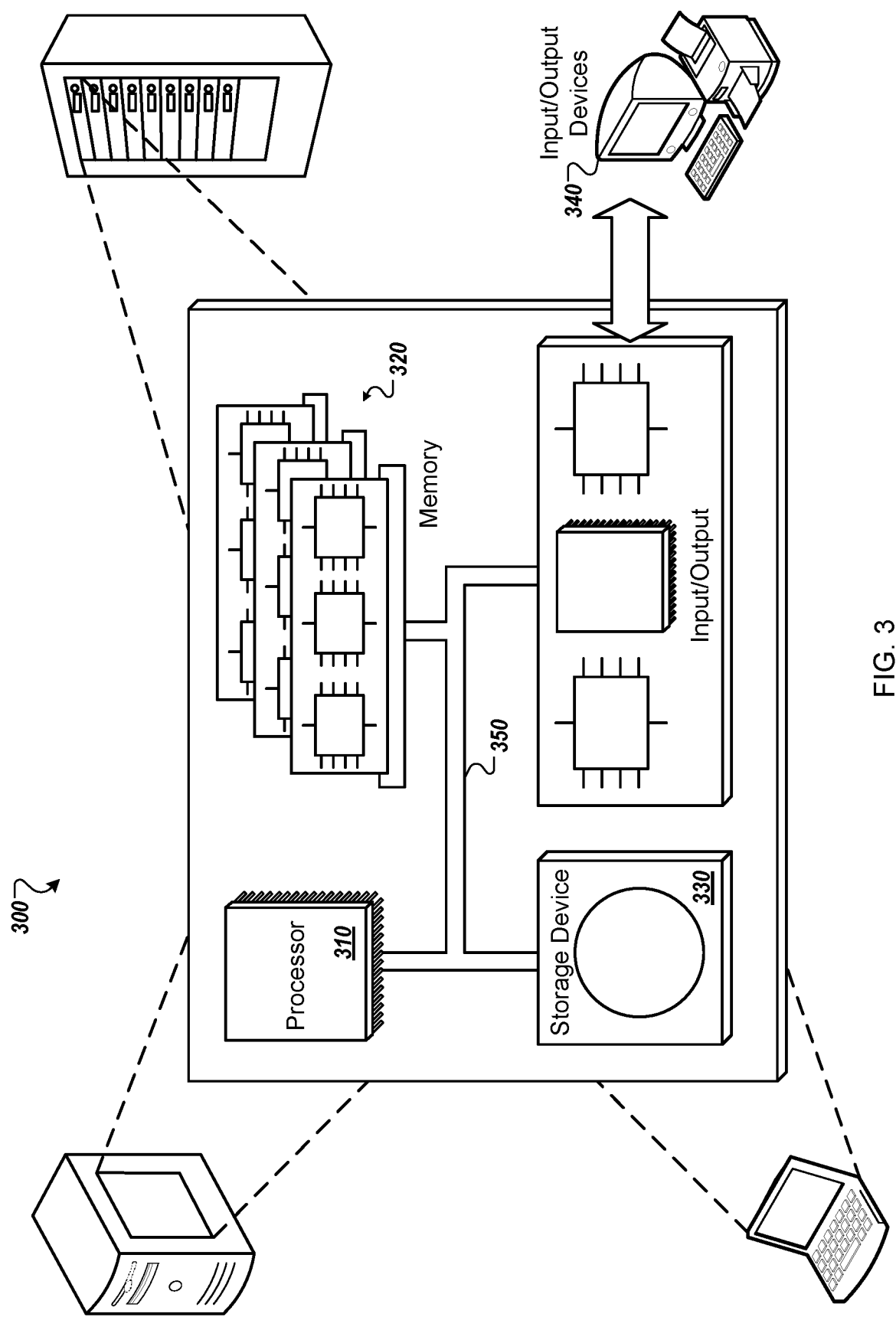
FIG. 3 is a block diagram of a computing system that can be used in connection with computer-implemented methods described in this document.

An example of one such type of computer is shown in FIG. 3, which shows a schematic diagram of a generic computer system 300. The system 300 can be used for the operations described in association with any of the computer-implemented methods described previously, according to one implementation. The system 300 includes a processor 310, a memory 320, a storage device 330, and an input/output device 340. Each of the components 310, 320, 330, and 340 are interconnected using a system bus 350. The processor 310 is capable of processing instructions for execution within the system 300. In one implementation, the processor 310 is a single-threaded processor. In another implementation, the processor 310 is a multi-threaded processor. The processor 310 is capable of processing instructions stored in the memory 320 or on the storage device 330 to display graphical information for a user interface on the input/output device 340.

The memory 320 stores information within the system 300. In one implementation, the memory 320 is a computer-readable medium. In one implementation, the memory 320 is a volatile memory unit. In another implementation, the memory 320 is a non-volatile memory unit.

The storage device 330 is capable of providing mass storage for the system 300. In one implementation, the storage device 330 is a computer-readable medium. In various different implementations, the storage device 330 may be a floppy disk device, a hard disk device, an optical disk device, or a tape device.

The input/output device 340 provides input/output operations for the system 300. In one implementation, the input/output device 340 includes a keyboard and/or pointing device. In another implementation, the input/output device 340 includes a display unit for displaying graphical user interfaces.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
   determining, by a memory management unit, in response to an initial turn on of the memory management unit, a memory size of a memory managed by the memory management unit;
   determining, based on the memory size, a first length, a second length, and a third length, wherein:
   the first length defines an address field of the first length, and the address field references a memory location in the memory;
   the second length is less than the first length and defines a length of address data in the address field, wherein the second length is selected as a number of bits required to address each memory location in the memory; and
   the third length is less than the first length, the first length being a sum of the second length and the third length, the third length being the length of a signature for verifying access to an address;
   the determination of the first length, the second length, and the third length are based on i) a memory size of the memory and ii) a probability that a device may successfully determines the signature on a first attempt to guess the signature; and processing requests for data stored in a memory location of the memory using requests of the first length that include address data of the second length and a signature of the third length.

2. The computer-implemented method of claim 1, wherein the probability is proportional to $1/2^N$, where N is equal to the third length.

3. The computer-implemented method of claim 1, further comprising:
receiving, by the memory management unit and from a device, a request i) for data stored in a memory location in the memory, the request including data in an address field of the first length and that references the memory location;
extracting, from the data in the address field, address data that has the second length;
extracting, from the data in the address field, a first signature that has the third length;
generating, using only the address data that has the second length, a second signature;
determining whether the first signature is the same as the second signature; and
in response to determining that the first signature is the same as the second signature, providing, by the memory management unit and to the device, data from the memory location.

4. The computer-implemented method of claim 3, further comprising:
decrypting the address data after extracting the address data from the data in the address field, wherein generating the second signature comprises generating, using the decrypted address data, the second signature.

5. The computer-implemented method of claim 3, further comprising:
in response to not determining that the first signature is the same as the second signature, not providing data from the memory location.

6. The computer-implemented method of claim 2, wherein extracting the first signature comprises extracting leading data from the data in the address field.

7. A system comprising:
a data processing apparatus; and
a non-transitory computer readable storage medium in data communication with the data processing apparatus and storing instructions executable by the data processing apparatus and upon such execution cause the data processing apparatus to perform operations comprising:
determining, by a memory management unit, in response to an initial turn on of the memory management unit, a memory size of a memory managed by the memory management unit;
determining, based on the memory size, a first length, a second length, and a third length, wherein:
the first length defines an address field of the first length, and the address field references a memory location in the memory;
the second length is less than the first length and defines a length of address data in the address field, wherein the second length is selected as the number of bits required to address each memory location in the memory; and
the third length is less than the first length, the first length being a sum of the second length and the third length, the third length being the length of a signature for verifying access to an address;
the determination of the first length, the second length, and the third length are based on i) a memory size of the memory and ii) a probability that a device may successfully determine the signature on a first attempt to guess the signature; and
processing requests for data stored in a memory location of the memory using the first using a requests of the first length that include address data of the second length and a signature of the third length.

8. The system of claim 7, wherein the probability is proportional to $1/2^N$, where N is equal to the third length.

9. The system of claim 7, further comprising:
receiving, by the memory management unit and from a device, a request i) for data stored in a memory location in the memory, the request including data in an address field of the first length and that references the memory location;
extracting, from the data in the address field, address data that has the second length;
extracting, from the data in the address field, a first signature that has the third length;
generating, using only the address data that has the second length, a second signature;
determining whether the first signature is the same as the second signature; and
in response to determining that the first signature is the same as the second signature, providing, by the memory management unit and to the device, data from the memory location.

10. The system of claim 9, further comprising:
decrypting the address data after extracting the address data from the data in the address field, wherein generating the second signature comprises generating, using the decrypted address data, the second signature.

11. The system of claim 10, further comprising:
in response to not determining that the first signature is the same as the second signature, not providing data from the memory location.

12. The system of claim 9, wherein extracting the first signature comprises extracting leading data from the data in the address field.

13. A non-transitory computer readable storage medium storing instructions executable by a data processing apparatus and upon such execution cause the data processing apparatus to perform operations comprising:
determining, by a memory management unit, in response to an initial turn on of the memory management unit, a memory size of a memory managed by the memory management unit;
determining, based on the memory size, a first length, a second length, and a third length, wherein:
the first length defines an address field of the first length, and the address field references a memory location in the memory;
the second length is less than the first length and defines a length of address data in the address field, wherein the second length is selected as a number of bits required to address each memory location in the memory; and
the third length is less than the first length, the first length being a sum of the second length and the third length, the third length being the length of a signature for verifying access to an address;
the determination of the first length, the second length, and the third length are based on i) a memory size of the memory and ii) a probability that a device successfully determines the signature on a first attempt to guess the signature; and processing requests for data stored in a memory location of the memory using requests of the first length that include address data of the second length and a signature of the third length.

* * * * *